May 27, 1930.  J. S. ROWAN ET AL  1,760,609
STOCK INDICATOR
Filed May 19, 1926
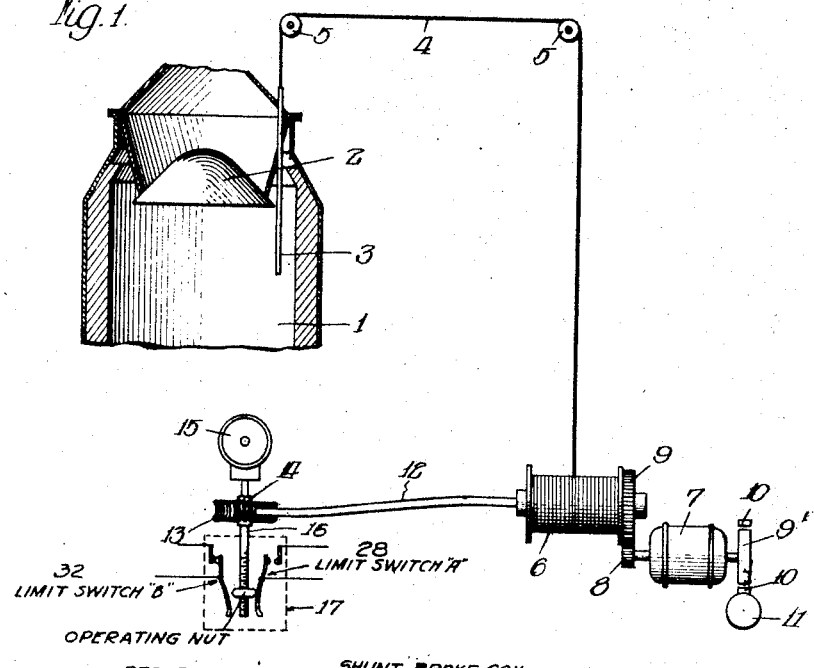
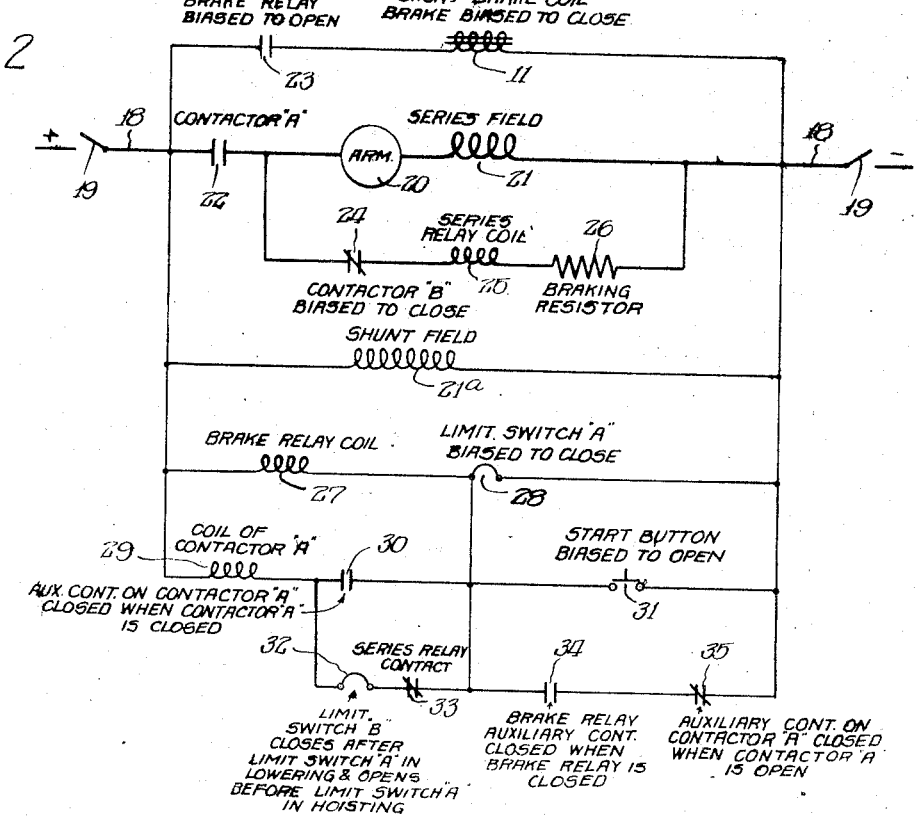
Witness:
P. Burkhardt
Inventors
John S. Rowan,
Gordon Fox, Patented May 27, 1930

1,760,609

UNITED STATES PATENT OFFICE

JOHN S. ROWAN, OF BALTIMORE, MARYLAND, AND GORDON FOX, OF CHICAGO, ILLINOIS; SAID ROWAN ASSIGNOR TO ROWAN CONTROLLER COMPANY, OF BALTIMORE, MARYLAND, A CORPORATION OF MARYLAND, AND SAID FOX ASSIGNOR TO FREYN ENGINEERING COMPANY, OF CHICAGO, ILLINOIS, A CORPORATION OF MAINE

STOCK INDICATOR

Application filed May 19, 1926. Serial No. 110,128.

The present invention relates to improvements in stock indicators.

In the application of Gordon Fox, Serial No. 97,810, filed March 26, 1926, for improvements in stock indicators, an invention was described relating to an improved structure for indicating the level of a charge within a receptacle. The present invention relates to the same general subject matter and has for one of its objects the provision of a structure which will accomplish the results aimed at in said Fox application with simpler structure than is involved in the invention described in said Fox application.

The present invention contemplates a device which is preferably of the recording type for indicating the level of the charge within a receptacle such for example as the charge within a blast furnace. According to the present invention, a try rod or similar device is provided which may be lowered until it rests upon the material within a blast furnace or other receptacle, the position of said try rod, which position may be indicated at any convenient distant point if desired, showing the level of the charge within said receptacle at the time of that particular test. The present invention contemplates means for conveniently operating said try rod or similar device, and a further object of the present invention is to provide a level indicator such for example as an indicator for the level of stock within a blast furnace which will effectually meet the needs of commercial operation.

A further object is to provide an improved level indicator of comparatively simple construction involving an electric hoist which upon a simple starting operation will automatically perform a complete cycle to indicate the level of the material being measured at that particular test.

A further object is to provide a level indicator of relatively simple construction which indicator has control means whereby said indicator may be controlled from and give its indication at a convenient point or points, which point or points may be at a distance from the material whose level is being measured.

A further object is to provide an efficient level indicator which will reduce to a minimum the time required for producing indications.

Further objects will appear as the description proceeds.

Referring to the drawings—

Figure 1 is a diagrammatic view illustrating one embodiment of the present invention; and Figure 2 is a schematic view illustrating the electrical connections of the apparatus shown in Figure 1.

A detailed explanation of the present invention may be prefaced by a short statement of the functions of the apparatus briefly described above.

As indicated above, the invention contemplates the use of a test or try rod which may have a movement of reciprocation in a vertical direction within a blast furnace or other receptacle. Said test or try rod may be controlled by means of a flexible connector, which in turn is controlled by a winding drum. Said winding drum is driven through suitable gear reductions by a shunt or compound electric motor. The shaft of said motor may carry a brake wheel, which may be controlled by a brake biased to braking position and having electrical means for releasing said brake. A recording meter may be driven from the shaft of said winding drum, said meter being operated by any of the well known means to produce the result that the amount of deflection of the stylus is proportional to the amount of rotation of the winding drum. Means are provided for opening a limit switch after a predetermined rotation of said winding drum. An illustrative cycle of operation may be stated as follows. Operation of a start button or similar means releases the brake above referred to and permits the test or try rod to lower. The descending motion is retarded by the motor, which is provided with suitable dynamic braking connections. The test or try rod descends until it rests upon the charge. Stoppage of movement of the test or try rod results in the operation of a relay, whereby a circuit is established to energize the motor to wind up the flexible connector, thereby hoisting the test or try rod. When the winding drum has attained a zero position corresponding to the topmost position of the try rod, the limit switch is opened, the brake is applied to prevent the accidental lowering of said test or try rod, and the motor is disconnected from circuit. The test or try rod is then held by the brake until the inauguration of the next cycle. Obviously, the cycle may be inaugurated by the pushing of a push button, or may be inaugurated in response to movement of any suitable part of the mechanism, such for example as the charging bell of a blast furnace. The particular means for inaugurating the cycle form no part of the present invention.

According to the illustrated embodiment of the present invention, a blast furnace 1 is indicated, having the charging bell 2. Mounted within the blast furnace is the test or try rod 3, which test or try rod is controlled by means of the flexible connector 4 disposed upon the sheaves 5—5. Said flexible connector 4 is connected to the winding drum 6, which may be grooved if preferred. An electric motor 7 is provided for turning the drum 6, a pinion 8 being mounted upon the motor shaft adapted to engage with the gear 9 coaxially mounted with the winding drum 6. The shaft of the electric motor 7 is provided with the brake wheel 9′, which brake wheel is controlled by the brake shoes 10—10, which shoes are normally biased to braking position. A brake coil 11 is provided which when energized is adapted to hold the brake shoes 10—10 out of braking relationship with the brake wheel 9′. Driven from the winding drum 6 is the flexible shaft 12 adapted to drive the worm 14. Said worm 14 engages with the worm wheel 13, which worm wheel is adapted to drive the recording meter 15. The worm wheel 13 is adapted, through connections not shown, to control the member 16 for operating the normally closed limit switch 17. Said limit switch 17 includes two limit switch contacts "A" and "B", which bear the numerals 28 and 32, respectively, on the drawing. Said limit switch contact "B" closes after the limit switch contact "A" in the lowering of the test or try rod 3 and opens before the limit switch contact "A" in hoisting. Such limit switches are well known in the market and need not be described in detail. Figure 1 illustrates more or less schematically how the limit switch contacts "A" and "B" may be operated as the try rod 3 is raised and lowered.

Figure 2 shows schematically the electrical connections of the mechanism shown in Figure 1. The numerals 18—18 indicate the two sides of an electric circuit, which circuit may be controlled by the blades 19—19 of a double pole switch. The electric motor 7 comprises the armature 20, the series field winding 21, and the shunt field winding 21ᵃ, said armature and series field winding being connected across the conductors 18—18 through the contactor 22, which contactor carries the caption "Contactor A". Said contactor "A" is biased to open position. The shunt field winding 21ᵃ is connected across the conductors 18—18. Also connected across the conductors 18—18 is a circuit including the brake relay 23, biased to open position, and the shunt brake coil 11, which controls the brake shoes 10—10 cooperating with the brake wheel 9′. Said brake shoes 10—10 are biased to closed or braking position. Bridged across the circuit of the armature 20 and the series field winding 21 is a circuit including the contactor 24, the series relay coil 25 and the braking resistor 26. Said contactor 24, which bears the caption "Contactor B", is an auxiliary contactor on contactor "A" and is biased to closed position. Said contactor "B" opens when contactor "A" closes.

Bridged across the conductors 18—18 is a circuit including the brake relay coil 27 and the limit switch contact 28, which limit switch contact is designated in Figure 2 with the letter "A". Connected in parallel with the brake relay coil 27 is the circuit including the coil 29 and an auxiliary contactor 30. Said coil 29 is the operating coil for contactor "A", which contactor "A" bears the numeral 22. The contactor 30 is an auxiliary contactor on contactor "A" and is closed when contactor "A" is closed. The limit switch contact 28 is bridged by the start button 31, whereby said start button may complete the circuit for the brake relay coil 27 across the conductors 18—18. Bridged across the auxiliary contactor 30 is a circuit including the limit switch contact "B", indicated by the numeral 32, and the series relay contact 33. As noted above, said limit switch contact "B" closes after the limit switch contact "A" in the lowering of the test or try rod 3, and opens before the limit switch contact "A" in hoisting. The series relay contact 33 is biased to closed position. Bridged across the start button 31 is a circuit including the auxiliary contactor 34 and the auxiliary contactor 35. The contactor 34 is the brake relay auxiliary contactor, closed when the brake relay is closed. The contactor 35 is an auxiliary contactor on the contactor "A", closed when contactor "A" is open. It will be understood, of course, that when coils 27 and 29 are simultaneously deenergized and auxiliary contactors 34 and 35 are allowed to move, contactor 35 will break contact before contactor 34 makes contact, inasmuch as the breaking of a contacting relationship of contactor 35 occurs practically simultaneously with the deengerization of the corresponding coil 29, whereas the contact making relationship of contactor 34 occurs only after a predetermined travel of said contactor 34, which travel begins with the deenergization of the corresponding coil 27. In practice, it will be preferred to provide positive means for ensuring that contactor 35 will break contact before contactor 34 makes contact. Such positive means may include structure requiring a longer range of travel of contactor 34 than of contactor 35.

When the test or try rod 3 is suspended above the charge at the uppermost limit of the travel of said rod 3, the brake shoes 10 are applied in braking relationship with the brake wheel 9' to hold said test or try rod 3 in said uppermost or zero position. At this time the limit switch contacts "A" and "B", indicated by the numerals 28 and 32, are open. There is no current on the motor 7, except that on the shunt field. When it is desired to inaugurate the cycle of movement of the test rod 3, the operator may depress the start button 31 momentarily. This action closes the circuit from the positive conductor 18, through the brake relay coil 27, to the negative conductor 18. Energization of the brake relay coil 27 results in the closing of the brake relay 23. This action results in the energization of the shunt brake coil 11, resulting in the releasing of the shoes 10—10 from the brake wheel 9'. Contactor "A", indicated by the numeral 22, is open and contactor "B", indicated by the numeral 24, is closed at this time. The weight of the test rod 3 causes the armature 20 thereof to revolve. A current is immediately circulated through the local circuit comprising the armature 20, the series field 21, the braking resistor 26, the series relay coil 25 and contactor "B". The flow of braking current through the series relay coil 25 causes the series relay contact 33 to open. As the test rod 3 descends and the armature 20 revolves, the limit switch "A" closes. Closure of the limit switch merely completes a parallel circuit to the existing circuit through the brake relay auxiliary contact 34 and the auxiliary contact 35. Further movement of the test rod 3 through the corresponding movement of the worm wheel 13 and member 16, causes limit switch contact "B" to close. Since the series relay contactor 33 has been opened, as above described, there is no immediate effect from this action. The test rod 3 continues to descend, and the armature 20 revolves until the test rod 3 rests upon the charge. The test rod 3 then stops and the motor stops, since its impelling force is removed and it is subject to a dynamic braking action. When the armature 20 stops revolving, the current in the series relay coil 25 falls to zero, resulting in the closure of the series relay contactor 33. A circuit is thereby established from the positive conductor 18, through the coil 29 of contactor "A", through limit switch contact "B", through the series relay contactor 33, through limit switch contact "A", to the negative conductor 18. By reason of the energization of the coil 29, the contactor "A" is closed. The brake relay coil 27 remains energized through limit switch contact "A", and the brake shoes 10—10 remain in released position.

When contactor "A", indicated by the numeral 22, closes, the motor 7 is connected across the conductors 18—18 in a direction to cause the drum 6 to wind up the cable 4 and hoist the test rod 3. As this movement continues and the test rod approaches its zero position, the limit switch contact "B", indicated by the numeral 32, opens. There is no immediate effect, since contactor "A" has established a maintaining circuit for itself from positive conductor 18, through the coil 29 of said contactor "A", through the contactor 30 and through limit switch contact "A", to the negative conductor 18. Further hoisting movement causes limit switch contact "A", indicated by the numeral 28, to open. This causes the brake relay coil 27 to be deenergized, resulting in the opening of the brake relay 23, whereby the brake shoes 10—10 are allowed to move into braking relationship with the brake wheel 9'. Contactor "A", indicated by the numeral 22, opens and the motor 7 stops. The brake shoes 10—10 hold the test rod 3 in its zero position. It should be noted that limit switch contact "B", indicated by the numeral 32, closes subsequently to the closure of limit switch contact "A", indicated by the numeral 28, in the lowering movement of the test rod. Said limit switch contact "B" opens before limit switch contact "A" in the hoisting movement. Said limit switch contact "B" has the important function of affording a differential element of movement sufficient to enable the armature 20 to revolve and set up current in the series relay coil 25 at the beginning of the cycle, thus preventing contactor "A", indicated by the numeral 22, from being improperly closed before the series relay 23 has a chance to open.

An important feature of the present invention is that promptly upon stoppage of the test rod when it strikes the charge, the dynamo electric machine is energized as a motor to lift said rod. This advantage is of importance inasmuch as it minimizes the effects of momentum in causing overrunning of the cable attached to the test rod. Obviously, the parts responsive to the series relay coil 25 may be so adjusted that they will operate upon any predetermined change in the generating functions of the dynamo electric machine. Accordingly, stoppage of the movement of the test rod 3, without any appreciable slack in the cable 4, results in the energization of the dynamo electric machine as a motor, minimizing the effects of overrunning of the parts and making the rods decidedly more certain than has been the case in prior practice.

Though a preferred embodiment of the present invention has been described in detail, it will be understood that many modifications will occur to those skilled in the art. It is intended to cover all such modifications that fall within the scope of the appended claims.

What is claimed is—

1. A level indicator comprising a test member, an electric motor for raising said test member, brake means for said motor biased to braking relationship with said motor, electric control means for causing the dropping of said test member, said electric control means including means responsive to the stoppage of movement of said test member for raising said test member to a predetermined position.

2. A level indicator including a test member, an electric motor for raising said test member, brake means for said motor, and electrical control means for releasing said brake means from said motor and permitting said test means to operate said motor as a generator for braking purposes, said electrical control means including means responsive to the stoppage of movement of said test member for energizing said motor to lift said test member.

3. A level indicator comprising a test member, an electric motor for lifting said test member, electrical control means for said motor for limiting the extent to which said motor may raise said test member, said electrical control means including a switch biased to open position and means responsive to said switch for causing said test member to operate said motor as a generator for braking purposes, said means including a device responsive to the stoppage of said test member for connecting said motor to raise said test member.

4. A level indicator comprising a test member, an electric motor for lifting said test member, electrical control means for said motor for limiting the extent to which said motor may raise said test member, said electrical control means including a switch biased to open position and means responsive to said switch for causing said test member to operate said motor as a generator for braking purposes, said means including a device responsive to the stoppage of said test member for connecting said motor to raise said test member, and an indicator responsive to the movement of said motor for indicating the range of movement of said test member.

5. A level indicator including a test member, a dynamo electric machine, hoisting mechanism for said test member, said hoisting mechanism being connected to said dynamo electric machine, a brake for said dynamo electric machine for holding said test member in raised position, a starting switch biased to open position, electrical control means responsive to the momentary closure of said starting switch for releasing said brake to permit the lowering of said test member, said electrical control means including means for causing the energization of said dynamo electric machine as a motor, said last mentioned means being responsive to the operation of said dynamo electric machine as a generator and being operative when said dynamo electric machine decreases its generating functions to cause said dynamo electric machine to lift said test member.

6. A level indicator including a test member, a dynamo electric machine, hoisting mechanism for said test member, said hoisting mechanism being connected to said dynamo electric machine, a brake for said dynamo electric machine for holding said test member in raised position, a starting switch biased to open position, electrical control means responsive to the momentary closure of said starting switch for releasing said brake, for causing the generator action of said dynamo electric machine to restrict the speed in lowering, and for causing the energization of said dynamo electric machine as a motor in response to decreasing of said generator action.

7. A level indicator including a test member, a dynamo electric machine, hoisting mechanism for said test member, said hoisting mechanism being connected to said dynamo electric machine, a brake for said dynamo electric machine for holding said test member in raised position, a starting switch biased to open position, electrical control means responsive to the momentary closure of said starting switch for releasing said brake, for causing the generator action of said dynamo electric machine to restrict the speed in lowering, for causing the energization of said dynamo electric machine as a motor in response to decreasing of said generator action, and for setting said brake upon said dynamo electric machine to hold said test member in raised position.

8. A level indicator comprising a test member, an electric motor for raising said test member, electric control means for initiating the dropping of said test member to rotate the rotor of said motor, said motor being provided with a dynamic braking circuit, and means responsive to changes in the electrical conditions in said dynamic braking circuit for causing said motor to perform motor functions for raising said test member.

9. A level indicator including a test member, an electric motor for raising said test member, said test member being adapted to rotate the rotor of said motor to cause said motor to perform generator functions, said motor being provided with an electric braking circuit, and means responsive to changes in generator functions of said dynamo electric machine for rendering inoperative said electric braking circuit and rendering said motor operative to perform motoring functions to lift said test member.

10. A level indicator comprising a test member, an electric motor for lifting said test member, electric control means for said motor for limiting the extent to which said motor may raise said test member, said test member being adapted to operate said motor as a generator for braking purposes, and means responsive to the generator functions of said motor when acting as a generator for connecting said motor to raise said test member.

11. A level indicator including a test member, a dynamo electric machine, hoisting mechanism for said test member, said hoisting mechanism being connected to said dynamo electric machine and being adapted to drive said dynamo electric machine with generator functions, electric control means for said dynamo electric machine, said electric control means being responsive to the operation of said dynamo electric machine as a generator and being operative upon decrease in generating functions of said dynamo electric machine to cause said dynamo electric machine to operate as a motor to lift said test member.

Signed at Baltimore, Maryland, this 12th day of May, 1926, by JOHN S. ROWAN, and at Chicago, Illinois, this 14 day of May, 1926, by GORDON FOX.

JOHN S. ROWAN.
GORDON FOX.